United States Patent
Cornet et al.

[19]

[11] Patent Number: 6,125,996
[45] Date of Patent: Oct. 3, 2000

[54] TRANSFER DEVICE

[75] Inventors: Maurice Cornet, Montlucon; Alain Guiffant, Le Havre, both of France

[73] Assignee: Sidel, Octeville sur Mer, France

[21] Appl. No.: 09/297,193

[22] PCT Filed: Nov. 4, 1997

[86] PCT No.: PCT/FR97/01968

§ 371 Date: Jul. 12, 1999

§ 102(e) Date: Jul. 12, 1999

[87] PCT Pub. No.: WO98/19942

PCT Pub. Date: May 14, 1998

[30] Foreign Application Priority Data

Nov. 4, 1996 [FR] France ................................. 96 13824

[51] Int. Cl.$^7$ ................................................. B65G 17/06
[52] U.S. Cl. ................................................. 198/852
[58] Field of Search ................................. 198/852, 644

[56] References Cited

U.S. PATENT DOCUMENTS 2,193,291  3/1940  Marchins .
2,455,624  12/1948  Tenety .
4,177,635  12/1979  Klimezky .
4,399,909  8/1983  Gorelic ..................................... 198/852
5,503,264  4/1996  Eberle ............................ 198/803.01 X

FOREIGN PATENT DOCUMENTS 001 194    3/1979   European Pat. Off. .
507 198    10/1992  European Pat. Off. .
385008     4/1908   France .
WO 96/19401  6/1996  WIPO .

*Primary Examiner*—Christopher P. Ellis
*Assistant Examiner*—Kenneth W Bower
*Attorney, Agent, or Firm*—Sughrue, Mion, Zinn, Macpeak & Seas, PLLC

[57] ABSTRACT

The invention concerns a device for transferring bodies (9) supported by plates ($A_i$, $B_i$) followed in succession in a mobile curved line; the plates are grouped in successive pairs ($A_i$, $B_i$) joined by a horizontal shaft (13) enabling their mutual rotation; the adjacent plates of two successive pairs ($B_{i-1}$, $A_i$; $B_i$, $A_{i+1}$) are coupled and articulated about at least one vertical rotation axis (2); further the horizontal shaft (13) is preferably arranged such that there is a clearance between the plates ($A_i$, $B_i$) so that they can slope with respect to each other perpendicularly to said horizontal and vertical axes.

11 Claims, 4 Drawing Sheets

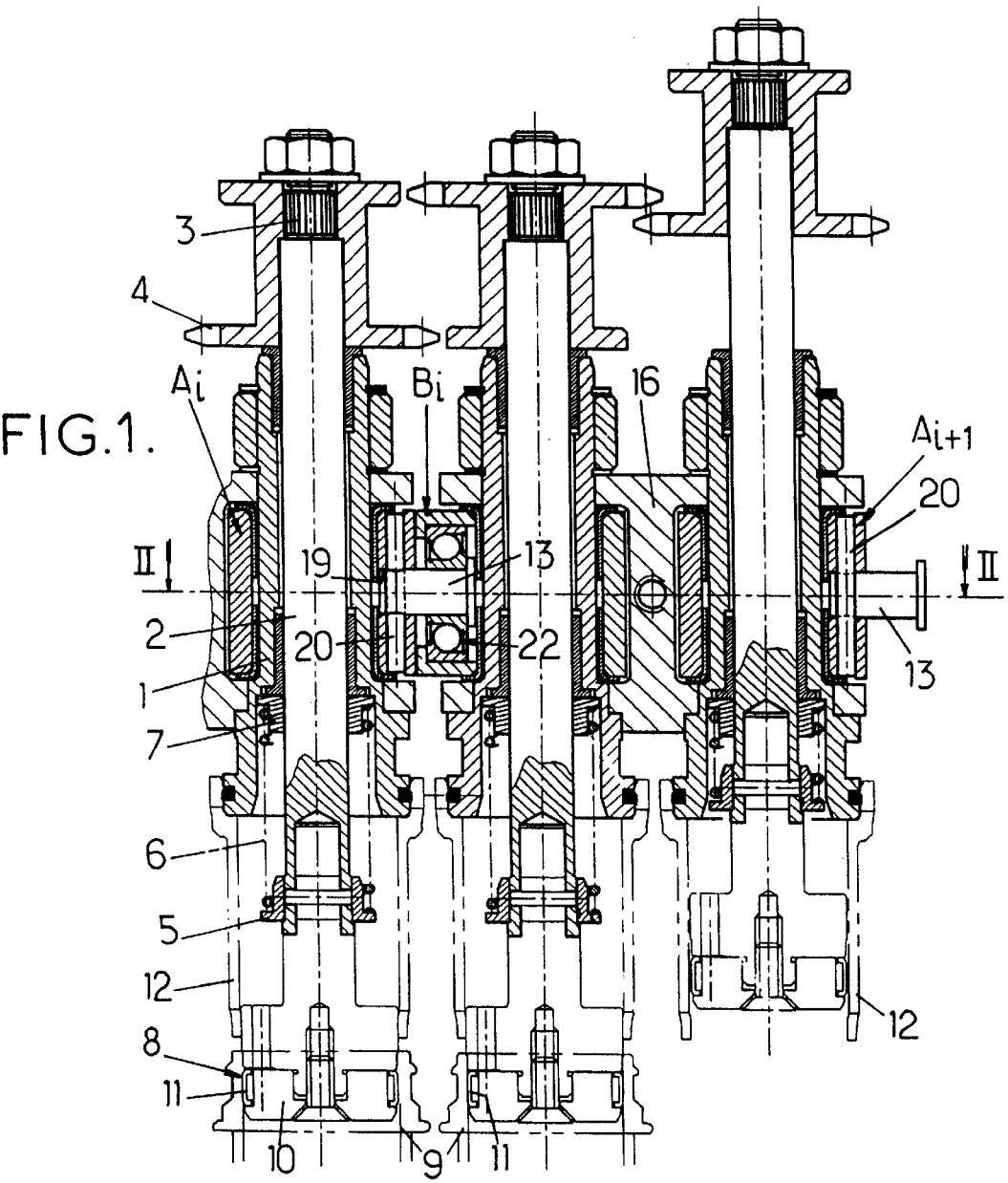

TRANSFER DEVICE

The present invention relates to improvements made to body transfer devices, this device comprising a multiplicity of plates supporting respective bodies which are coupled one after another in an endless curvilinear mobile chain with articulations suitable to allow the curvilinearity of said mobile chain and simultaneously the rotation of the plates around a horizontal axis so as to turn the bodies over or set them upright.

The improvements according to the invention relate preferably, although not exclusively, to devices for transferring hollow bodies made of thermoplastic material equipped with an opening forming a neck such as preforms, bottles, flasks or the like, this device comprising a multiplicity of plates supporting respective hollow bodies which are coupled one after another in an endless curvilinear mobile chain with articulations suitable to allow the curvilinearity of said mobile chain and simultaneously the rotation of the plates around a horizontal axis so as to turn the hollow bodies over (neck down) or set them upright (neck up).

A transfer chain constituted as mentioned above is found particularly in plants manufacturing containers made of thermoplastic material, such as bottles, flasks or the like, in particular to move the preforms from a loading point to and through a heating furnace (a tunnel kiln) in which the constituent material of the preforms is heated in order to be then molded, by a blowing or drawing-blowing process, into a large size container (intermediate container or final container). The transfer chain is generally arranged so that the linear movement of the preforms is accompanied, in addition to the above-mentioned actions of turning over/setting upright, by a rotation of the preforms on themselves so that the material is heated uniformly over the whole periphery of the preforms, the heating means being placed unilaterally in the furnace.

In known transfer devices, the successive plates are joined in an articulated way to each other by means of spherical couplings, as is described for example in the document FR 2 728 547 in the name of the Applicant company.

This type of spherical coupling connection offers the advantage of giving each plate all the required degrees of rotational freedom in relation to the surrounding plates, allowing the curvilinearity of the transfer chain, the setting upright and the turning over of the hollow bodies and the possibility for the chain to have some vertical deflection on account of its weight.

However, this known arrangement has the drawback of being expensive to manufacture (sphere or spherical cap; spherical trough).

Considering the large number of plates involved in the composition of such a transfer chain (up to several hundred), it has seemed desirable to design a transfer device able to offer the same operating characteristics, but which only involves straightforward, easy to manufacture and assemble, and therefore less expensive articulations.

To this end, a transfer device as mentioned in the preamble is characterized, being arranged in accordance with the invention, in that the plates supporting the bodies are coupled in the following way:

the plates are joined in successive pairs and the two plates of each pair are coupled by a horizontal shaft allowing the mutual rotation of the two plates around said shaft to turn the bodies over or set them upright and, each of the two above-mentioned plates of a pair is coupled to another immediately adjacent plate belonging to a neighboring pair in an articulated way around at least one vertical axis of rotation which is suitable to allow their mutual inclination around said vertical axis.

By means of this arrangement, each axis of rotation (vertical allowing curvilinearity of the chain; horizontal for turning over/setting upright the hollow bodies) is constituted in a distinct and therefore mechanically straightforward way and of inexpensive design.

In a preferred embodiment, the above-mentioned horizontal shaft coupling the two above-mentioned plates of each pair is configured so that there remains some clearance between said two plates of each pair and that these may tilt relative to each other vertically by mutual rotation around an imaginary axis perpendicular at the same time to the above-mentioned horizontal and vertical axes.

Thus, not only are the two types of axis of rotation achieved which are operationally required for the correct processing of the bodies on the conveyor, but additionally a third degree of rotational freedom is conferred to the system which, although being of very restricted angular amplitude at the level of each coupling shaft, is however sufficient to avoid the plates jamming against each other under the action of their own weight (deflection).

To advantage, the shaft prevents the mutual inclination of these two plates (Ai, Bi) around a vertical axis; it is also to advantage that the coupling of two plates belonging respectively to neighboring pairs is suitable to prevent their mutual rotation around a horizontal axis.

In an embodiment preferred on account of its structural simplicity and its relatively low cost, the horizontal coupling shaft of the two plates is rigidly fixed, by one of its ends, with a first of the plates and is connected to the second plate, by its other end, by means of a ball bearing; preferably, then, the ball bearing comprises, on the one hand, an internal race surrounding said other end of the coupling shaft and supported against an end support surface formed by a widened head of said shaft end and, on the other hand, an external race restrained in a cavity provided in said second plate; it is then desirable that the above-mentioned clearance between the two plates of a same pair is allowed by means of the configuration of the internal race, the external race and the balls.

With regard now to the articulation of the plates around vertical axes suitable to allow a curvilinear trajectory of the transfer chain, it is desirable to provide a coupling component interposed between each of the two said plates and the plate which is immediately adjacent to it, said coupling component being articulated with the two plates which it then joins around two respective axes of rotation; preferably then, the two axes of rotation of the coupling component and of the two respective plates are respectively coaxial to the bodies supported by the plates. By means of this arrangement, all the bodies coincide with the vertical axes of rotation of the support plates and thus all the bodies are certain to follow absolutely identical trajectories in the chain movement curved portions, which is extremely important for example when it comes to bodies moving past heating lamps during heat treatment.

It is then beneficial to take advantage of the presence of the coupling component to attribute additional functions to it. In particular, it may be arranged that the coupling component supports additionally at least one guide part suitable to engage with a fixed cam controlling rotation around the above-mentioned horizontal shaft for turning the bodies over or setting them upright. In this way, the two plates to which the coupling component is coupled are rotated in a perfectly synchronous way and these two plates, although placed head to foot, can be made structurally in an absolutely identical way, which simplifies manufacture and reduces production costs.

Considering the arrangements in accordance with the invention which have just been disclosed, it may be noted that the plates are no longer totally independent of each other, from the point of view of the different rotations, as was the case in previous devices. The plates are, here, fixed in pairs: each plate is fixed to one of the adjacent plates for rotation around the horizontal axis (turning the hollow bodies over/setting them upright) and with the opposite adjacent plate for rotation around the vertical axis (curvilinearity of the chain). However, this fixing in pairs poses no problem in practice and therefore does not constitute a handicap.

The invention will be better understood from reading the following description of some embodiments given solely as purely illustrative examples. In this description, reference is made to the appended drawings in which:

FIG. 1 is a side view, in cross section, of a part of a body transfer device arranged in accordance with a preferred embodiment of the invention;

FIG. 2 is a sectional plan view along the line II—II in FIG. 1;

Figure 3:
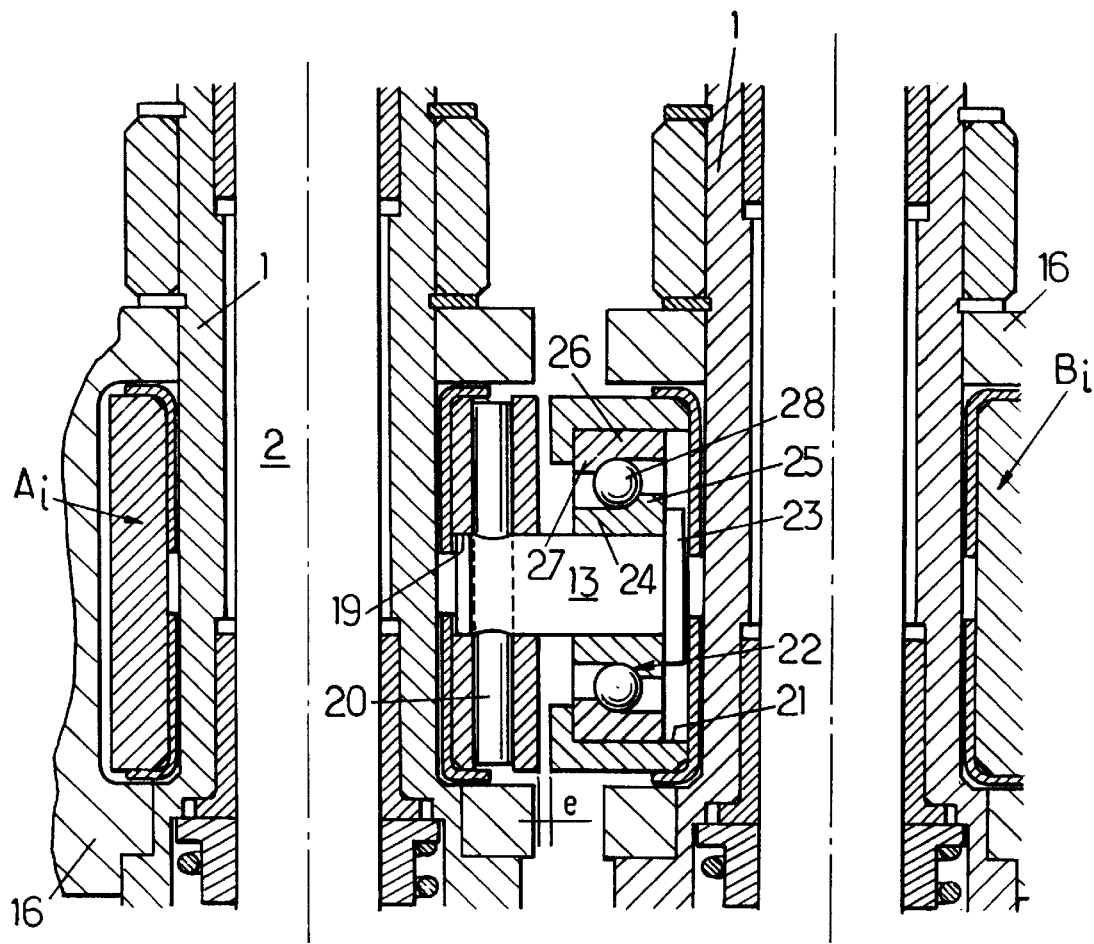
FIGS. 3 and 4 are very enlarged scale views, in side view, of a part of the device in FIG. 1, in two different operational positions respectively.

In the following detailed description, a device for the transfer of hollow bodies will be considered which seems to constitute an advantageous and preferred application of the invention, it being understood however that the invention can be applied to devices for the transfer of all bodies.

Referring firstly to FIG. 1, there can be seen a part of a device for the transfer of hollow bodies particularly made of thermoplastic material equipped with an opening forming a neck such as preforms, bottles, flasks, etc.

The transfer device comprises a multiplicity of successive pairs of support plates Ai, Bi, these plates being suitable to support respective hollow bodies. These plates are coupled one after another in a way which will be clarified below so as to constitute an endless curvilinear mobile chain.

Each plate Ai, Bi supports a vertical tubular body 1 in which a rod 2 is supported to freely rotate with generally the possibility of axial movement.

Each rod 2 has an upper end 3 projecting beyond the tubular body 1 and on which is fixed, rotating integrally, a cogwheel 4 suitable to mesh with a link chain such as a sprocket chain (not shown) which is placed fixed along the trajectory followed by the transfer device: the meshing of the wheel 4 with the fixed link chain causes the rod 2 to rotate on itself, for example for the purpose of the even exposure of a hollow body to the radiation from a heating component placed unilaterally.

At its lower end, the rod 2 has a shoulder 5 on which is supported a return spring 6 supported at its other end against an internal shoulder 7 of the tubular body.

The lower end of the rod 2 furthermore supports a gripping head 8 suitable to hold a hollow body 9 (middle rod in FIG. 1) by its neck. In the example shown, the head 8 comprises a central core 10 supporting a peripheral bush 11 radially deformable elastically which, being inserted into the neck of the hollow body 9, retains it by friction.

In FIG. 1, the two left-hand and middle rods are held in the low position under the action of the return spring 6 (loaded position), whereas the right-hand rod is brought back up under the action of an external force (for example a cam) against the spring 6 so that the head 8 is brought back up into a tubular skirt 12 extending the tubular body 1 downwards and driving the hollow body 9 off the head 8 (unloaded or loading stand-by position).

The arrangement which has just been described is given only as an example and is not directly related to the arrangements in accordance with the invention which will now be described more exactly.

Figure 5:
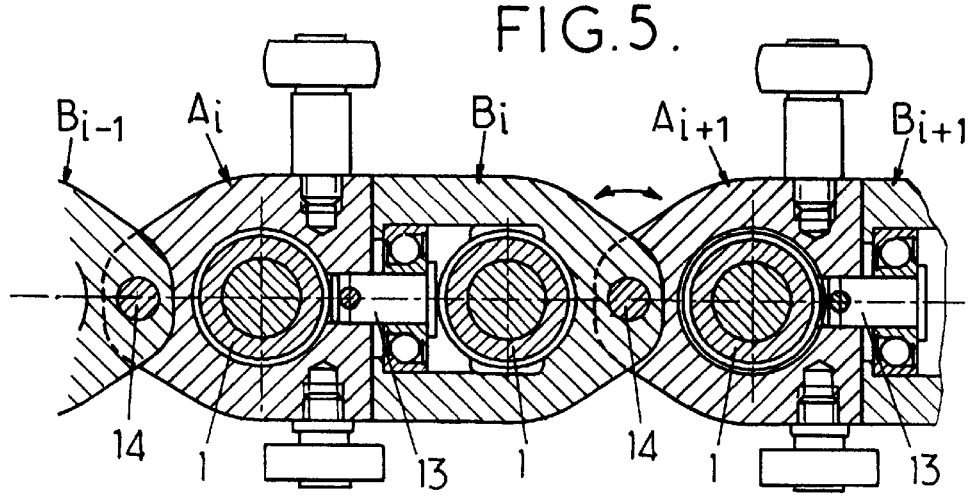
FIGS. 5 and 6 show, in plan view, two other embodiments respectively of the device in FIGS. 1 and 2.
Figure 6:
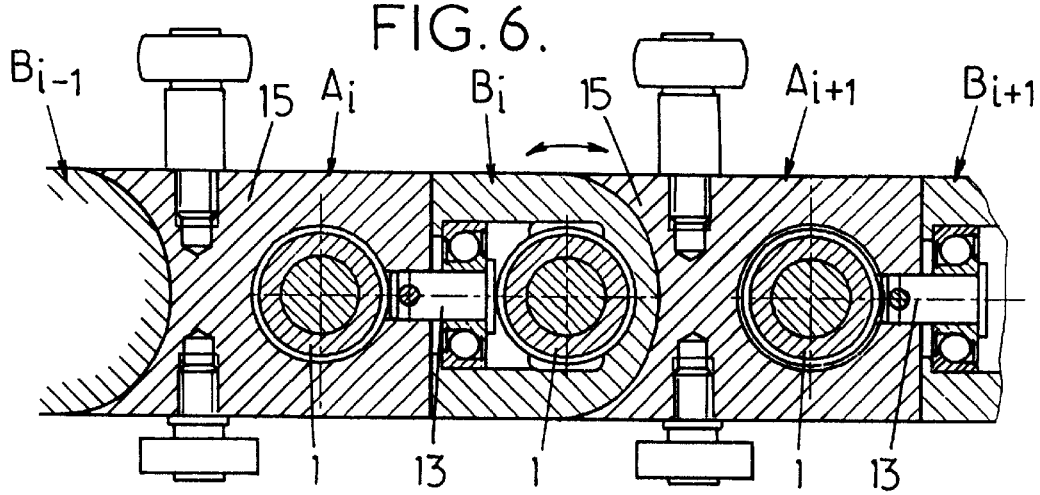

As can be seen more easily in the three FIGS. 2, 5 and 6, two consecutive plates Ai, Bi are coupled to each other by a horizontal shaft 13 (i.e. extending approximately along the direction of movement of the endless chain) allowing only mutual rotation of the two plates Ai, Bi around said shaft (turning the hollow bodies over neck down, or setting the hollow bodies upright neck up) and preventing any mutual approximate inclination of these two plates around a vertical axis.

Furthermore, each of the two above-mentioned plates Ai, Bi is coupled to another immediately adjacent plate (Ai, with Bi−1 situated to its left in the drawing; Bi with Ai+1 situated to its right in the drawing) in an articulated way around at least one vertical axis of rotation suitable to allow only the mutual inclination of the plates Ai−1 and Bi, and Ai and Bi−1 around said vertical axis and to prevent their mutual rotation around a horizontal axis.

As regards this latter arrangement, it is possible to couple by a vertical pivot 14 the corresponding overlapping ends of the pairs of plates Ai, Bi−1; Bi Ai+1; etc, as is shown in FIG. 5.

It is also conceivable, as is shown in FIG. 6, to equip each plate Ai with an elongated part 15 (extending leftwards in the drawing) suitable to partially overlap the adjacent plate Bi−1 and to surround the tubular body 1 supported by the latter: thus it is said tubular bodies 1 of the plates Bi which constitute the vertical articulation pivots.

However, it will be noted that, both in the embodiment in FIG. 5 and in that in FIG. 6, some at least of the tubular bodies 1 do not follow absolutely the median axis in the curved parts of the trajectory (the two tubular bodies 1 of the plates Ai and Bi respectively in the arrangement in FIG. 5; the tubular body 1 of the plate Ai in the arrangement in FIG. 6). In this case, at least some tubular bodies are, in the curved parts of trajectories, slightly offset towards the center of curvature. In some applications, a serious drawback may result from this (for example when passing through a heating furnace, the hollow bodies supported by the rods 2 centered in these tubular bodies are respectively brought more or less closer to or moved away from the laterally placed heating lamps according to the assembly location of these lamps, and the heat treatment of these bodies is faulty).

To avoid this drawback, use can advantageously be made of the arrangement in FIG. 2 in which a coupling component 16 is implemented which is interposed between the plates to be coupled Ai, Bi−1; Bi Ai+1; etc. This coupling component 16 is arranged to partially overlap the plates Bi and Ai+1 (or Ai, and Bi−1), by surrounding the tubular bodies 1 supported by them. In this way, the axes of all the tubular bodies 1 of the device coincide with vertical articulation axes and it is then certain that all the hollow bodies supported by said tubular bodies will follow absolutely the same centered trajectory.

The place available on the coupling components 16 may be used to advantage to equip them with certain accessories, for example the wheels or rollers 17, 18 required to control turning over/setting upright by engagement with a fixed cam.

Figure 4:
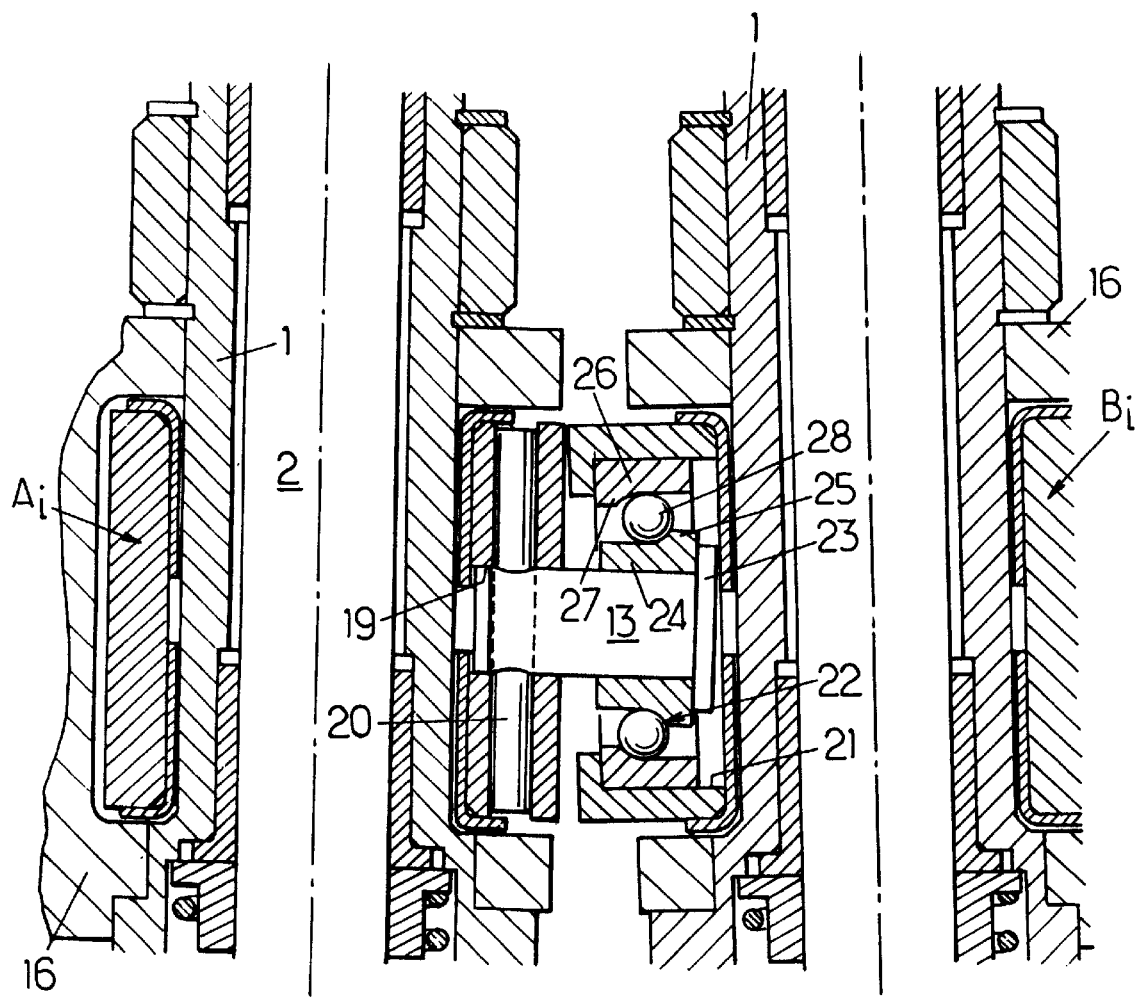

With regard now to the coupling of the plates Ai, Bi by means of a horizontal shaft 13, use may be made to advantage of the preferred embodiment shown in FIG. 1 and, on an enlarged scale, in FIGS. 3 and 4.

At one of its ends, the shaft 13 can be fixed rigidly to one of the plates, here plate Ai. To this end, provision may be made for plate Ai to be provided with an axial housing 19 in which is engaged without notable clearance said end of the shaft 13 and a vertical cotter pin 20 is fitted in coincident holes drilled in the plate Ai and the shaft 13 to lock the shaft in the plate both axially and in rotation.

The other end of the shaft 13 is engaged in an internal cavity 21 in the other plate Bi and a ball bearing 22 is interposed between the shaft 13 and the plate Bi. To this end, the internal race 24 of the ball bearing surrounds the shaft 13 and is supported axially against an end formed by a widened terminal head 23 of the shaft 13. The external race 26 of the ball bearing 22 rests against the wall of the aforementioned cavity 21 and is supported axially against a front rim of the cavity 21. The internal race 24 has a peripheral annular rim 25 extending radially relative to the shaft 13, on the side of the widened terminal head 23, and towards the external race 26. The external race 26 has a peripheral annular rim 27 extending radially relative to the shaft 13 on the side opposite the widened head 23, and towards the internal race 24. Thus, in operation, the balls 28 are jammed between the races 24, 26 not only radially, but also axially and transmit the tensile force from one plate to the next when the chain is moving.

Lastly, the mutually facing surfaces of the plates Ai and Bi respectively are approximately plane so as to facilitate the mutual rotational motion.

However, as can be seen in FIG. 3, it is desirable for the two mutually facing surfaces of the plates Ai and Bi not to be held absolutely pinned one against the other and for the length of the shaft 13 to be specified so that an approximate clearance e, although very small, remains between them. In FIGS. 3 and 4, this clearance has been considerably enlarged to make the drawings easy to read; but in practice a clearance e of less than about 0.8mm, preferably about 0.2 to 0.5mm, may suffice for the commonest plant architectures concerned.

As a result of this arrangement, the shaft 13 remains perfectly integral with the plate Ai, but as shown in FIG. 4, plate Bi may effect a rotational or tilting movement relative to plate Ai, given the possibility of a slight mutual displacement of the two races 24, 26 of the ball bearing and within the limit imposed by the value of the clearance e. This movement or tilting corresponds to a capacity for rotation around an imaginary axis of rotation perpendicular at the same time to the horizontal (shaft 13) and vertical (axis of the tubular bodies 1) axes which have been discussed above.

In this way the whole chain is enabled to take, locally, the deflection required for proper operation of the device despite the considerable weight of each component (all the parts are machine made from steel).

Figure 7:
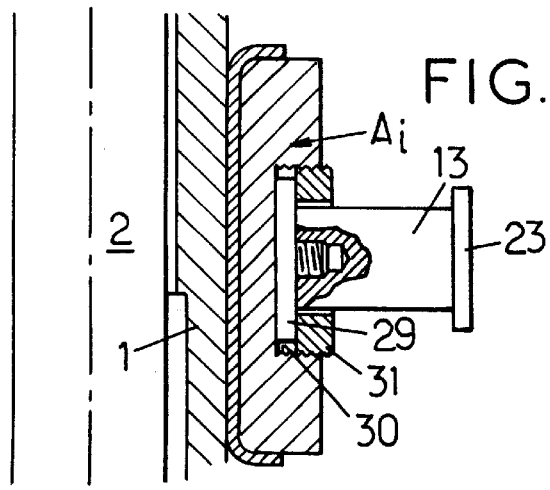
FIG. 7 is a fragmentary view showing an embodiment variant of a part of the device in FIGS. 1 to 6.

Clearly, the coupling between the pairs of plates Ai and Bi could be made of different materials. In particular, it is not imperative for the shaft 13 to rotate integrally with one of the plates (here plate Ai), and it could just as well be coupled to plate Ai in free rotation, possibly with interposition of a bearing. By way of example, in FIG. 7 the shaft 13 has a second widened head 29 which is engaged in a tapped channel 30 of the plate Ai and which is retained therein and locked axially by a nut 31.

However, the embodiment which has been more specifically described above and shown in the drawings is the one which seems at the present time the most suitable in terms of mechanical strength and reliability, structural simplicity and the lowest possible cost both for manufacture and maintenance.

What is claimed is:

1. A body transfer device, this device comprising a multiplicity of plates (Ai, Bi) each supporting a body and which are coupled one after another in an endless curvilinear mobile chain with articulations suitable to allow the curvilinearity of said mobile chain and simultaneously the rotation of the plates around a horizontal axis so as to turn the bodies over or set them upright, characterized in that the plates supporting the bodies are coupled in the following way:

the plates are joined in successive pairs (Ai, Bi) and the two plates (Ai, Bi) of each pair are coupled by a horizontal shaft (13) allowing the mutual rotation of the two plates around said shaft to turn the bodies (9) over or set them upright and, each of the two above-mentioned plates (Ai, Bi respectively) of a pair is coupled to another immediately adjacent plate belonging to a neighboring pair (Bi−1 Ai+1 respectively) in an articulated way around at least one vertical axis of rotation suitable to allow their mutual inclination around said vertical axis.

2. A device for transferring hollow bodies (9) made of thermoplastic material equipped with an opening forming a neck such as preforms, bottles, flasks or the like, this device comprising a multiplicity of plates (Ai; Bi) supporting respective hollow bodies which are coupled one after another in an endless curvilinear mobile chain with articulations suitable to allow the curvilinearity of said mobile chain and simultaneously the rotation of the plates around a horizontal axis so as to turn the hollow bodies over (neck down) or set them upright (neck up), characterized in that it is constituted according to claim 1.

3. A device according to claim 1, characterized in that additionally, the above-mentioned horizontal shaft (13) coupling the two above-mentioned plates (Ai, Bi) of a pair is configured so that there remains some clearance between said two plates (Ai, Bi) of each pair and that these may tilt relative to each other vertically by mutual rotation around an imaginary axis perpendicular at the same time to the above-mentioned horizontal and vertical axes.

4. A device according to claim 1, characterized in that the horizontal shaft (13) coupling the two plates (Ai, Bi) of each pair of plates prevents the mutual inclination of these two plates (Ai, Bi) around a vertical axis.

5. A device according to claim 1, characterized in that the coupling of two plates belonging respectively to neighboring pairs is suitable to prevent their mutual rotation around a horizontal axis.

6. A device according to claim 1, characterized in that the horizontal coupling shaft (13) of the two plates (Ai, Bi) of a pair is rigidly fixed, by one of its ends, to a first of the plates (Ai) and is connected to the second plate (Bi), by its other end, by means of a ball bearing (22).

7. A device according to claim 6, characterized in that the ball bearing (22) comprises, on the one hand, an internal race surrounding said other end of the coupling shaft (13) and supported against a terminal support surface formed by a widened head (23) of said shaft (13) end and, on the other hand, an external race retained in a cavity (21) provided in said second plate (Bi).

8. A device according to claim 7, characterized in that the configuration of the internal race (24), the external race (26) and the balls (28) allows the above-mentioned clearance between the two plates (Ai, Bi) of a same pair.

9. A device according to claim 1, characterized in that it comprises a coupling component (16) interposed between each of the two above-mentioned plates (Ai Bi respectively) and the plate which is immediately adjacent to it (Bi−1; Ai+1 respectively), said coupling component (16) being articulated with the two plates which it joins (Ai, Bi−1 Ai+1, Bi) around two respective axes of rotation.

10. A device according to claim 9, characterized in that the coupling component (16) supports additionally at least one guide part (17, 18) suitable to engage with a fixed cam controlling rotation around the above-mentioned horizontal shaft for turning the bodies over or setting them upright.

11. A device according to claim 9, characterized in that the two axes of rotation of the coupling component (16) and of the two respective plates are respectively coaxial to the tubular bodies (1) supported by the plates.

* * * * *